3,278,583
N-ARYLOXYALKYL N-ARALKOXYAMINES AND
RELATED COMPOUNDS
Frank M. Berger, Princeton, and Bernard J. Ludwig, North
Brunswick, N.J., assignors to Carter Products, Inc.,
New York, N.Y., a corporation of Maryland
No Drawing. Filed Dec. 26, 1963, Ser. No. 333,670
6 Claims. (Cl. 260—471)

The present invention relates to novel N-aryloxyalkyl N-aralkoxyamines and related compounds. In a further aspect, this invention relates to novel compositions and methods for lowering blood cholesterol.

It is an object of this invention to provide novel N-aryloxyalkyl N-aralkoxyamines and related compounds which are effective as active ingredients in compositions useful in lowering blood cholesterol in warm-blooded animals, including humans. It is another object of this invention to provide novel compositions of matter which have the effect of lowering blood cholesterol upon administration of such compositions to warm-blooded animals, including humans. It is a further object of this invention to provide a novel method for lowering blood cholesterol in warm-blooded animals, including humans. Other objects will become apparent to those skilled in the art in the light of the instant specification.

In its broad aspect, this invention relates to compounds of the general formula:

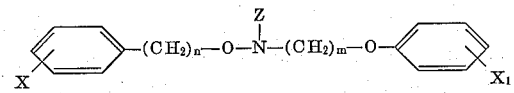

wherein X and $X_1$ are each selected from the group consisting of hydrogen, halogen and lower alkyl; $n$ is an integer selected from the class consisting of 1 and 3; $m$ is an integer having a value of from 2 to 4; and Z is selected from the group consisting of hydrogen,

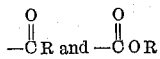

wherein R is selected from the group consisting of alkyl and aryl. As used herein and in the appended claims, the term "lower alkyl" signifies an alkyl radical having from 1 to 6 carbon atoms.

Illustrative compounds of the present invention, as well as analytical data and physical constants for such compounds, appear in Table B given hereinafter.

A class of novel compounds of the present invention can be prepared by reacting an aralkyl carboalkoxyhydroxamate, produced by the known condensation of an aralkyl halide and an N-hydroxyalkylcarbamate, with an aryloxyalkyl halide to produce the desired aralkyl N-aryloxyalkyl carboalkoxyhydroxamate (I) according to the following reaction scheme:

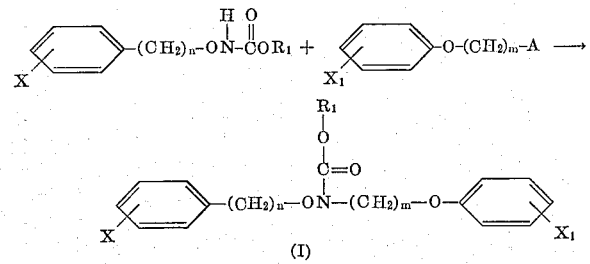

wherein A is halogen, $R_1$ is alkyl, and X, $X_1$, $m$, and $n$ are as hereinbefore described. The reaction is conducted at elevated temperatures, in a liquid alcoholic reaction medium, and under the influence of alkali. Preferably, the reaction is conducted in an ethanolic potassium hydroxide or sodium ethylate solution, at the reflux temperature of the reaction mixture.

The N-aryloxyalkyl N-aralkoxyamines of the present invention, i.e., compounds wherein Z in the general formula is hydrogen, are prepared by alkaline hydrolysis of the corresponding aralkyl N-aryloxyalkyl carboalkoxyhydroxamate (I) as follows:

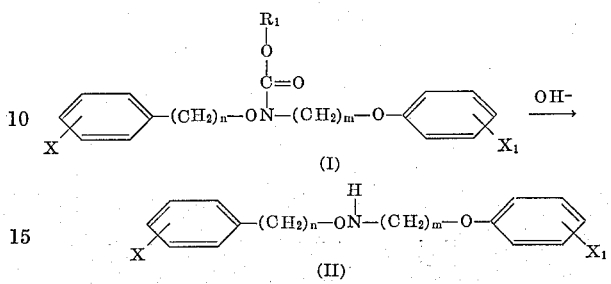

Novel aralkyl N-aryloxyalkyl carboaryloxyhydroxamates are prepared from the corresponding N-aryloxyalkyl N-aralkoxyamines (II) by reaction with an appropriate aryl chloroformate in the presence of a suitable acid acceptor, such as, for example, an alkali metal hydroxide, pyridine or a tertiary amine, such as dimethylaniline. The reaction scheme is as follows:

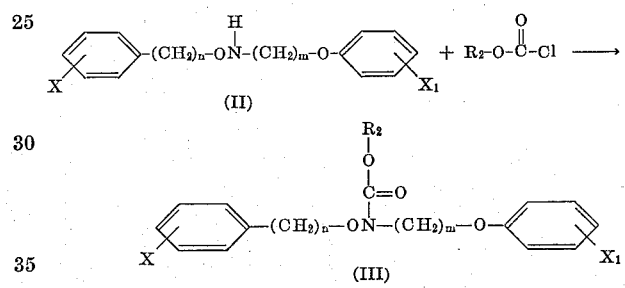

wherein $R_2$ is aryl.

Substituting an appropriate alkyl chloroformate for the aryl chloroformate in the above reaction, i.e. when $R_2$ is alkyl, represents an alternate method for preparing the novel aralkyl N-aryloxyalkyl carboalkoxyhydroxamates (I).

The compounds of the present invention wherein Z in the general formula represents an acyl radical can be prepared from the corresponding N-aryloxyalkyl N-aralkoxyamines (II) by the reaction with an appropriate acyl halide in the presence of a suitable acid acceptor, such as, for example, an alkali metal hydroxide, pyridine, or a tertiary amine.

As hereinbefore indicated, the compounds of the present invention are useful as the active ingredient in novel compositions which are effective in lowering the blood cholesterol content in warm-blooded animals, including humans.

In forming the novel compositions of this invention, the active ingredient is incorporated in a suitable carrier such as, for example, a pharmaceutical carrier, beverage or foodstuff. Any suitable pharmaceutical carrier may be used for formulating the compositions of this invention, such as, for example, starch, lactose, glucose, sucrose, gelatin, powdered licorice, powdered marshmallow, powdered tragacanth, malt, rice flour, powdered althaea, magnesium carbonate, chalk, and the like. Among the liquid pharmaceutical carries which may be utilized are ethyl alcohol, propylene glycol, polyethylene glycol, water, saline, glycerine and water mixtures, glucose syrup, honey, mucilage of acacia, syrup of acacia, mucilage of tragacanth, glyceride of starch, etc. Also, the active ingredient may be incorporated in a foodstuff such, for example, as incorporating it in butter, margarin, and the like. The preferred carrier for a given active ingredient depends upon the desired use and nature of the active ingredient.

For example, a liquid active ingredient is preferably administered in the form of a soft gelatin capsule containing a therapeutic dose of the active ingredient. A crystalline solid active ingredient is preferably administered in the form of a capsule or tablet. When the composition of this invention is in the form of a solid, the active ingredient is generally in an amount from about 25 to 95% by weight of the solid composition. When the composition of this invention is in the form of a solution, the active ingredient is generally in an amount of from about 0.1 gram to 90 grams per 100 grams of solution.

When the compounds of the present invention are amines, that is when Z is hydrogen, they may also be employed in the form of their physiologically acceptable salts such as the hydrohalides (preferably the hydrochloride), salts with other readily tolerated inorganic acids such as sulfuric or phosphoric acid, and salts with the commonly used organic acids such as acetic, citric, maleic, and tartaric acid.

An in vivo technique which has been valuable in the determination of cholesterol lowering action of drugs is the procedure of Cuthbertson et al., 1959 (Brit. J. Nutrition, volume 13, page 227). Using the formulation given by these investigators, a stock diet (A) which is essentially normal rodent diet comparable to that available from commercial feed dealers, and a special high fat diet (B) are prepared. The "B" diet features 2% cholesterol; 0.5% cholic acid; and specially prepared hydrogenated arachis oil, 22%; also corn strach, 45.5%; crude casein, 25%; choline chloride, 1%; and salt and vitamin mixtures. The hydrogenated arachis oil specifies a 92° F. melting point with limits of 90–93° F. Drugs to be evaluated are added to Diet B at fixed graded concentrations in the diet, ranging from 0.125 to 2%. Male Charles River albino weanling rats weighing approximately 50 grams are placed in individual cages equipped with specially designed self-feeder devices which permit accurate determination of daily food intake. Groups of six animals, kept in individual cages, receive each of the concentrations of drugs. In addition, a group of six on the stock die (A) serves as a negative control, and a high fat diet (B) group of six serves as a positive control. The rats are placed on the special diets for fourteen consecutive days, after which time one to three milliliter blood samples are obtained by intracardiac puncture, and subjected to assay for their cholesterol content. The animals serving as the negative control group (Diet A) maintain a cholesterol level in the normal range which is less than 100 mg./100 ml. of serum, whereas the positive control group (Diet B) show a marked elevated level of the order of 800 mg./100 ml.

The active ingredients used in accordance with this invention, when incorporated in Diet B following the above described Cuthbertson et al. method, exhibit a cholesterol lowering activity. In general, when such active ingredients are in concentrations of about 0.25% in Diet B, the percent reduction in the blood cholesterol level is about 60% or more as compared to the positive control (Diet "B") without the active ingredient. Thus, if a positive control group given Diet B shows a blood cholesterol level of about 800 mg./100 ml., the active ingredients of this invention, if incorporated in such Diet B, in a concentration of about 0.25%, would generally reduce the blood cholesterol level of this positive group to about 320 mg./100 ml. or lower. Effective drugs usually show a direct relationship between the concentration of drug in the diet, and the percent reduction in the blood cholesterol levels as compared to the positive control (Diet B without drug).

A number of preferred compounds found to exhibit especially outstanding activity in lowering blood cholesterol levels, when tested by the in vivo procedure of Cuthbertson et al. method described hereinbefore in detail, are shown in Table A. In each instance, the carrier was Diet B containing the active ingredient in a concentration of 0.25%. The activity (percent cholesterol lowering) was obtained in the manner described hereinbefore, i.e. determining the percent reduction in the blood cholesterol levels by incorporating the active ingredient in Diet B as compared to Diet B without the active ingredient.

TABLE A

| Compound No. | Compound | Percent Reduction |
|---|---|---|
| 3 | N-γ-phenoxypropyl-N-benzyloxyamine hydrochloride. | 77 |
| 4 | N-γ-phenoxypropyl-N-m-methylbenzyloxyamine hydrochloride. | 91 |
| 6 | N-δ-phenoxybutyl-N-m-methylbenzyloxyamine hydrochloride. | 83 |
| 9 | Benzyl N-β-phenoxyethyl carbethoxyhydroxamate. | 88 |
| 10 | Benzyl N-β-m-toloxyethyl carbethoxyhydroxamate. | 77 |
| 12 | Benzyl N-γ-phenoxypropyl carbethoxyhydroxamate. | 88 |

The active ingredients used in accordance with this invention are non-toxic in amounts required to effect significant reduction of blood cholesterol. In general, the daily dose for an average person (e.g. about 150 pounds in weight) is between 50 and 3000 mg., and, preferably, between 200 and 1000 mg.

The following examples illustrate the preparation of a representative number of novel compounds of the invention. The numbers used to identify the compounds correspond to the numbers used in Table B, which follows hereinafter.

EXAMPLE I

*Preparation of N-γ-phenoxypropyl-N-m-methylbenzyloxyamine hydrochloride (Compound 4)*

(a) 38 grams of N-hydroxyurethane in 100 ml of 95% ethanol were combined with stirring at 25° C. with a solution of 36 grams of potassium hydroxide in 200 ml. of 95% ethanol. 100 grams of alpha-bromo-m-xylene was added at once and the temperature maintained at about 30° C. using external cooling. The mixture was stirred overnight and the potassium hydroxide removed by filtration. The filtrate was concentrated under reduced pressure and dissolved in ether. The ether solution was extracted thoroughly with cold 10% aqueous sodium hydroxide. The ether extract was dried, freed from solvent by distillation, and the residue fractionated under reduced pressure. 17 grams (22%) of pure m-methylbenzyl carbethoxyhydroxamate was obtained, distilling at 100–103° at 0.05 mm.

(b) To a solution of sodium ethylate prepared from 2.3 grams of sodium metal and 220 ml. of anhydrous ethanol there was added 20.9 grams of m-methylbenzyl carbethoxyhydroxamate prepared as described above and 21.5 grams of γ-bromopropyl phenyl ether and the mixture was refluxed for four hours. At such time a solution of 8.8 grams of sodium hydroxide in 100 ml. of water was added to the reaction mixture and refluxing was continued for two additional hours. The ethanol was removed by distillation at atmospheric pressure until the still head temperature reached 87° C. and the residue was cooled and extracted with 350 ml. of ether. The ether extract was washed with water until neutral and dried over sodium sulfate. The ether was removed and the residue distilled under reduced pressure. The fraction boiling at about 154° C./0.2 mm. consisted of N-γ-phenoxypropyl-N-m-methylbenzyloxyamine. The yield was 16.6 grams.

(c) The hydrochloride of the above compound was prepared by combining an anhydrous ether solution thereof with an equivalent amount of ethanolic hydrogen chloride. Recrystallization of the resulting precipitate from ethanol ether yielded the desired hydrochloride, M.P. 84–86° C.

EXAMPLE II

*Preparation of benzyl N-β-phenoxyethyl carbethoxyhydroxamate (Compound 9)*

To a solution of sodium ethylate prepared from 5.75 grams of sodium metal and 200 ml. of anhydrous ethanol there was added 48.8 grams of benzyl carbethoxyhydroxamate, prepared using the general method described in Example I(a), and 50.3 grams of β-bromophenetole. The mixture was then heated to reflux for eight hours. The pH of the reaction mixture was adjusted to about 7 by means of hydrochloric acid and the ethanol was removed by distillation until the vessel temperature reached 85° C. The cooled residue was diluted with 100 ml. of water and the aqueous mixture was extracted with 300 ml. of ether. The ether extract was washed successively with dilute sodium hydroxide solution, dilute hydrochloric acid and then with water until neutral. The ether extract was dried over sodium sulfate and the ether was removed. Fractionation of the residue under reduced pressure yielded 61.1 grams of the desired product, B.P. 162° C./0.1 mm.

EXAMPLE III

*Preparation of N-β-phenoxyethyl-N-benzyloxyamine hydrochloride (Compound 1)*

A solution of 43.5 grams of benzyl N-β-phenoxyethyl carbethoxyhydroxamate, prepared as described in Example II, and of 11.9 grams of sodium hydroxide in 120 ml. of 50% aqueous ethanol was refluxed for two hours. The ethanol was subsequently removed by distillation at atmospheric pressure until the still head temperature reached 87° C. The residue was cooled, diluted with 50 ml. of water and extracted with 250 ml. of ether. The ether extract was washed with water until neutral and dried over sodium sulfate. An excess of ethereal hydrochloric acid was added and the resulting precipitate collected by filtration. The yield of the desired product was 22.5 grams, M.P. 121–122° C.

EXAMPLE IV

*Preparation of benzyl N-β-m-toloxyethyl carbophenoxyhydroxamate (Compound 11)*

To a solution of 12.8 grams of N-β-m-toloxyethyl-N-benzyloxyamine, prepared substantially in accordance with the procedure set forth in Example I, and of 4.0 grams of pyridine in 100 ml. of ethyl ether, maintained at a temperature of about 10° C., there was added dropwise with stirring 7.8 grams of phenyl chloroformate. The mixture was stirred at room temperature for a period of three hours and was then added to water. The organic phase was separated, washed with dilute hydrochloric acid, and then with water until neutral. The ether was removed by distillation and the residue was purified by molecular distillation. The fraction collected at 165°/0.001 mm. consisted of the desired compound. The yield was 12.5 grams.

EXAMPLE V

*Preparation of N-β-(2,4-dichlorophenoxy)ethyl-N-γ-phenylpropoxyamine hydrochloride (Compound 8)*

To a solution of sodium ethylate prepared from 1.35 grams of sodium metal and 100 ml. of ethanol there was added 13.1 grams of γ-phenylpropyl carbethoxyhydroxamate, prepared by the procedure of Example I(a), and 15.8 grams of β-bromoethyl 2,4-dichlorophenyl ether. After refluxing the reaction mixture for a period of eight hours, a solution of 5.2 grams of sodium hydroxide in 100 ml. of water was added thereto. Reflux was then continued for an additional four hours. The ethanol was removed by distillation and the residue was extracted with ether. The ether extract was washed with water until neutral and then dried over sodium sulfate. Hydrogen chloride was passed through the solution until no further precipitation occurred. The precipitate was collected by filtration and recrystallized from ethanol to yield 8.8 grams of the desired product, M.P. 147–148° C.

EXAMPLE VI

*Preparation of N-β-m-toloxyethyl-N-benzyloxybenzamide (Compound 14)*

To a solution of 12.8 grams of N-β-m-toloxyethyl-N-benzyloxyamine, prepared by the general procedure of Example I, and of 4.3 grams of pyridine in 200 ml. of ethyl ether, there was added dropwise with stirring 7.0 grams of benzoyl chloride. The reaction mixture was heated to reflux for a period of three hours and was then added to water. The organic layer was separated, washed with dilute hydrochloric acid and then with water until neutral. The ether extract was dried over sodium sulfate and the ether was removed. The resulting oily residue was purified by molecular distillation to yield a fraction distilling at 175°/0.001 mm. consisting of the desired product. The yield was 12.7 grams.

EXAMPLE VII

*Preparation of m-methylbenzyl N-γ-p-chlorophenoxypropyl carbomethoxyhydroxamate (Compound 13)*

To a stirred dispersion of 13.0 grams of N-γ-p-chlorophenoxypropyl-N-m-methylbenzyloxyamine hydrochloride, produced by the procedure set forth in Example I, in 100 ml. of ether there was added 6.3 grams of pyridine and subsequently 3.6 grams of methyl chloroformate. The dispersion was maintained at a temperature of about 10° C. during the addition. The mixture was stirred at room temperature for a period of two hours and was then added to water. The organic layer was separated, washed with dilute hydrochloric acid and then with water until neutral. The residue obtained upon removal of the ether was purified by molecular distillation to yield a fraction distilling at 133°/0.001 mm. consisting of the desired product. The yield was 7.7 grams.

The following are examples of compositions formed in accordance with this invention which have the effect of lowering blood cholesterol upon administration to warm-blooded animals, including humans.

EXAMPLE A

A tablet is compressed from a composition having the following formula:

| | Mg. |
|---|---|
| N-δ-phenoxybutyl-N-m-methylbenzyloxyamine hydrochloride | 200 |
| Corn starch | 20 |
| Lactose | 20 |
| Magnesium stearate | 2 |
| Alginic acid | 4 |

EXAMPLE B

A tablet is compressed from a composition having the following formula:

| | Mg. |
|---|---|
| N-γ-phenoxypropyl-N-benzyloxyamine hydrochloride | 360 |
| Corn starch | 20 |
| Lactose | 70 |
| Magnesium stearate | 40 |
| Dicalcium phosphate | 40 |

EXAMPLE C

A tablet is compressed from a composition having the following formula:

| | Mg. |
|---|---|
| N-γ-phenoxypropyl-N-m-methylbenzyloxyamine hydrochloride | 200 |
| Corn starch | 20 |
| Lactose | 20 |
| Magnesium stearate | 2 |
| Alginic acid | 4 |

EXAMPLE D 200 mg. of N-γ-phenoxypropyl-N-m-methylbenzyloxyamine is mixed with 1.5 cc. of cottonseed oil and the resulting solution is encapsulated in a soft gelatin capsule.

EXAMPLE E 100 mg. of benzyl N-δ-phenoxypropyl carbethoxyhydroxamate is mixed with 0.25 cc. of corn oil and the resulting solution is encapsulated in a soft gelatin capsule.

EXAMPLE F 200 mg. of benzyl N-β-phenoxyethyl carbethoxyhydroxamate is mixed with 1.5 cc. of cottonseed oil and the resulting solution is encapsulated in a soft gelatin capsule.

Table B, mentioned hereinbefore, setting forth the physical constants for a number of compounds representative of the present invention, follows hereinafter:

is an integer having a value from 2 to 4; and Z is selected from the group consisting of hydrogen,

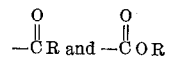

wherein R is selected from the group consisting of alkyl and aryl.

2. As a novel compound, N-γ-phenoxypropyl-N-benzyloxyamine.

3. As a novel compound, N-γ-phenoxypropyl-N-m-methylbenzyloxyamine.

4. As a novel compound, N-δ-phenoxybutyl-N-m-methylbenzyloxyamine.

5. As a novel compound, benzyl N-β-phenoxyethyl carbethoxyhydroxamate.

6. As a novel compound, benzyl N-γ-phenoxypropyl carbethoxyhydroxamate.

TABLE B

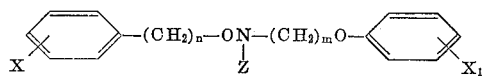

| No. | X | $n$ | $X_1$ | $m$ | Z | M.P., or B.P./mm. | $n_D^{25}$ | Formula | Analysis Calculated | | | | Analysis Found | | | |
|---|---|---|---|---|---|---|---|---|---|---|---|---|---|---|---|---|
| | | | | | | | | | C | H | N | Cl | C | H | N | Cl |
| 1 | H | 1 | H | 2 | H | 121–122 | | $C_{15}H_{18}ClNO_2$[b] | 64.40 | 6.48 | 5.01 | 12.67 | 64.26 | 6.39 | 4.95 | 12.64 |
| 2 | H | 1 | 3-CH$_3$ | 2 | H | 145/0.1 | 1.5532 | $C_{16}H_{19}NO_2$ | 74.68 | 7.44 | 5.44 | | 74.64 | 7.44 | 5.73 | |
| 3 | H | 1 | H | 3 | H | 103–104 | | $C_{16}H_{20}ClNO_2$[b] | 65.41 | 6.86 | 4.77 | 12.07 | 65.96 | 7.01 | 4.90 | 11.90 |
| 4 | 3-CH$_3$ | 1 | H | 3 | H | 84–86 | | $C_{17}H_{22}ClNO_2$[b] | 66.33 | 7.20 | 4.55 | 11.52 | 66.06 | 7.45 | 4.25 | 11.61 |
| 5 | 4-Cl | 1 | H | 3 | H | (a) | 1.5610 | $C_{16}H_{18}ClNO_2$ | 65.86 | 6.22 | 4.80 | 12.15 | 65.83 | 6.16 | 4.88 | 12.33 |
| 6 | 3-CH$_3$ | 1 | H | 4 | H | 119–120 | | $C_{18}H_{24}ClNO_2$[b] | 67.17 | 7.52 | 4.35 | 11.02 | 67.48 | 7.67 | 4.45 | 11.30 |
| 7 | 3-CH$_3$ | 1 | 4-Cl | 3 | H | 133–134 | | $C_{17}H_{21}Cl_2NO_2$[b] | 59.65 | 6.18 | 4.09 | 20.72 | 59.54 | 6.40 | 4.15 | 20.70 |
| 8 | H | 3 | 2,4-Cl$_2$ | 2 | H | 147–148 | | $C_{17}H_{20}Cl_3NO_2$[b] | 54.20 | 5.35 | 3.72 | 28.23 | 54.12 | 5.24 | 3.78 | 28.15 |
| 9 | H | 1 | H | 2 | COOC$_2$H$_5$ | 162/0.1 | 1.5379 | $C_{18}H_{21}NO_4$ | 68.55 | 6.71 | 4.44 | | 68.22 | 6.51 | 4.48 | |
| 10 | H | 1 | 3-CH$_3$ | 2 | COOC$_2$H$_5$ | 172/0.1 | 1.5342 | $C_{19}H_{23}NO_4$ | 69.28 | 7.04 | 4.25 | | 69.37 | 7.20 | 4.50 | |
| 11 | H | 1 | 3-CH$_3$ | 2 | COOC$_6$H$_5$ | (a) | 1.5690 | $C_{23}H_{23}NO_4$ | 73.19 | 6.14 | 3.71 | | 73.35 | 6.03 | 3.93 | |
| 12 | H | 1 | H | 3 | COOC$_2$H$_5$ | 168/0.1 | 1.5345 | $C_{19}H_{23}NO_4$ | 69.28 | 7.04 | 4.25 | | 69.41 | 7.04 | 4.46 | |
| 13 | 3-CH$_3$ | 1 | 4-Cl | 3 | COOCH$_3$ | (a) | 1.5465 | $C_{19}H_{22}ClNO_4$ | 62.73 | 6.09 | 3.85 | 9.74 | 62.89 | 6.83 | 3.86 | 9.89 |
| 14 | H | 1 | 3-CH$_3$ | 2 | COC$_6$H$_5$ | (a) | 1.5812 | $C_{23}H_{23}NO_3$ | 76.43 | 6.41 | 3.87 | | 76.39 | 6.34 | 4.03 | |
| 15 | 3-CH$_3$ | 1 | H | 4 | COCH$_3$ | (a) | 1.5454 | $C_{20}H_{25}NO_3$ | 73.36 | 7.70 | 4.28 | | 73.39 | 7.58 | 4.27 | |

[a] Liquid purified by molecular distillation. [b] Hydrochloride salt.

The invention in its broader aspects is not limited to the specific steps, methods and compositions described but departures may be made therefrom within the scope of the accompanying claims without departing from the principles of the invention and without sacrificing its chief advantages.

What is claimed is:
1. A compound of the general formula:

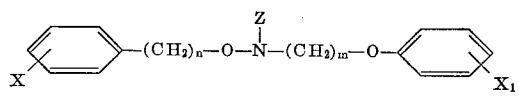

wherein X and $X_1$ are each selected from the group consisting of hydrogen, halogen and lower alkyl; $n$ is an integer selected from the class consisting of 1 and 3; $m$

References Cited by the Examiner

UNITED STATES PATENTS 2,289,599  7/1942  Smith et al. _____ 260—471
2,290,174  7/1942  Epstein et al. _____ 167—22
2,463,939  3/1949  Behrens _____ 260—471
2,978,381  4/1961  Freedman et al. _____ 167—65
2,980,585  4/1961  Stambul _____ 167—65

OTHER REFERENCES

Berger et al.: Chemical Abstracts, vol. 56, pages 16493–94.

LORRAINE A. WEINBERGER, *Primary Examiner.*

JULIAN S. LEVITT, *Examiner.*

G. A. MENTIS, L. A. THAXTON, *Assistant Examiners.*

UNITED STATES PATENT OFFICE
CERTIFICATE OF CORRECTION

Patent No. 3,278,583                                                October 11, 1966

Frank M. Berger et al.

It is hereby certified that error appears in the above numbered patent requiring correction and that the said Letters Patent should read as corrected below.

Column 2, line 64, for "carries" read -- carriers --; line 70, for "margarin" read -- margarine --; column 3, line 41, for "die" read -- diet --; column 7, line 7, for "N-δ-phenoxypropyl read -- N-γ-phenoxypropyl --; columns 7 and 8, Table B, ninth column, line 7 thereof, for "$C_{17}H_{21}Cl_2No_2{}^b$" read -- $C_{17}H_{21}Cl_2NO_2{}^+$ --.

Signed and sealed this 29th day of August 1967.

(SEAL)
Attest:

ERNEST W. SWIDER                                    EDWARD J. BRENNER
Attesting Officer                                           Commissioner of Patents